US012557736B2

(12) United States Patent
Patil et al.

(10) Patent No.: US 12,557,736 B2
(45) Date of Patent: Feb. 24, 2026

(54) SYSTEM, METHOD AND APPARATUS FOR FILLING A FEED MIXER

(71) Applicant: DEERE & COMPANY, Moline, IL (US)

(72) Inventors: Rupali S. Patil, Jalgaon (IN); Noel W. Anderson, Fargo, ND (US); Matthew G. Dold, Homburg (DE); Benjamin Buechner, Bottenbach (DE); Matthias Meyer, Kaiserslautern (DE)

(73) Assignee: Deere & Company, Moline, IL (US)

( * ) Notice: Subject to any disclaimer, the term of this patent is extended or adjusted under 35 U.S.C. 154(b) by 172 days.

(21) Appl. No.: 18/165,637

(22) Filed: Feb. 7, 2023

(65) Prior Publication Data

US 2023/0263131 A1     Aug. 24, 2023

(30) Foreign Application Priority Data

Feb. 21, 2022     (DE) .......................... 102022104049.6

(51) Int. Cl.
| | |
|---|---|
| *A01D 43/08* | (2006.01) |
| *A01K 5/00* | (2006.01) |
| *A01K 5/02* | (2006.01) |
| *A23N 17/00* | (2006.01) |
| *A01F 29/00* | (2006.01) |

(52) U.S. Cl.
CPC ......... *A01D 43/085* (2013.01); *A01D 43/086* (2013.01); *A01K 5/004* (2013.01); *A01K 5/0275* (2013.01); *A23N 17/007* (2013.01); *A01F 29/00* (2013.01)

(58) Field of Classification Search
CPC .... A01D 43/085; A01D 43/086; A01K 5/004; A01K 5/0275; A01F 29/00; A23N 17/007
See application file for complete search history.

(56) References Cited

U.S. PATENT DOCUMENTS

| | | | |
|---|---|---|---|
| 6,923,393 B1 * | 8/2005 | Neier | B01F 33/8305 |
| | | | 366/603 |
| 10,532,362 B2 * | 1/2020 | Torres Aso | A23N 17/007 |
| 11,076,626 B2 * | 8/2021 | Smith | A01F 25/00 |

(Continued)

FOREIGN PATENT DOCUMENTS

| | | |
|---|---|---|
| CN | 113615591 A | 11/2021 |
| DE | 2225783 A1 | 12/1973 |

(Continued)

OTHER PUBLICATIONS

Extended European Search Report and Written Opinion issued in European Patent Application No. 23153756.4, dated Jul. 20, 2023, in 08 pages.

(Continued)

*Primary Examiner* — Nicolas A Arnett

(74) *Attorney, Agent, or Firm* — Hanley, Flight & Zimmerman, LLC

(57) ABSTRACT

A system for filling a feed mixer, the system comprising: a feed intake device configured to take in a feedstock from a stockpile; a feed processing system for processing the feedstock and directing the processed feedstock into a container of the feed mixer; and a controller associated with the feed processing system, the controller configured to control processing of the feedstock by the feed processing system based on a prescribed recipe.

20 Claims, 2 Drawing Sheets

(56)                References Cited

U.S. PATENT DOCUMENTS

| | | | | |
|---|---|---|---|---|
| 12,361,683 | B2 * | 7/2025 | Rasmussen | A01D 43/102 |
| 2006/0191251 | A1 * | 8/2006 | Pirro | A01F 29/09 |
| | | | | 56/60 |
| 2009/0238031 | A1 | 9/2009 | Conard et al. | |
| 2010/0263345 | A1 * | 10/2010 | Goldenberg | A01K 5/004 |
| | | | | 241/101.8 |
| 2012/0130543 | A1 * | 5/2012 | Bassett | A01K 5/004 |
| | | | | 366/292 |
| 2017/0364089 | A1 * | 12/2017 | Strautmann | G05D 1/0274 |
| 2022/0022376 | A1 * | 1/2022 | Bohrer | A01D 90/02 |
| 2022/0279720 | A1 * | 9/2022 | Rasmussen | G06T 7/0002 |
| 2023/0232741 | A1 * | 7/2023 | Van Den Berg | A01K 5/0266 |
| | | | | 701/50 |

FOREIGN PATENT DOCUMENTS

| | | | | | |
|---|---|---|---|---|---|
| DE | 4220005 | A1 | | 1/1994 | |
| DE | 19654725 | A1 | | 1/1998 | |
| DE | 20301594 | U1 | * | 3/2003 | ......... A01F 25/2027 |
| DE | 102009027245 | A1 | | 12/2010 | |
| DE | 102010002343 | A1 | | 8/2011 | |
| DE | 102010033888 | A1 | | 2/2012 | |
| DE | 202015102527 | U1 | | 7/2015 | |
| DE | 202016106837 | U1 | | 3/2018 | |
| DE | 102021117470 | A1 | | 1/2022 | |
| EP | 1106047 | A1 | | 6/2001 | |
| EP | 1563725 | A1 | | 8/2005 | |
| EP | 1577663 | A1 | | 9/2005 | |
| EP | 1849348 | A1 | | 10/2007 | |
| EP | 2204088 | A1 | | 7/2010 | |
| EP | 2848131 | A1 | | 3/2015 | |
| EP | 3023004 | A1 | | 5/2016 | |
| EP | 3574750 | A1 | | 12/2019 | |
| ES | 2912121 | A1 | | 5/2022 | |
| WO | WO2005067704 | A1 | | 7/2005 | |
| WO | WO2009060442 | A2 | | 5/2009 | |

OTHER PUBLICATIONS

German Search Report issued in application No. DE102022104049.6 dated Sep. 28, 2022 (10 pages).

European Patent Office, "Notice pursuant to Article 94(3) EPC," issued in connection with European Patent Application No. 23153756. 4, dated Apr. 17, 2025, 15 pages. English language machine translation provided.

* cited by examiner

SYSTEM, METHOD AND APPARATUS FOR FILLING A FEED MIXER

RELATED APPLICATIONS

This document claims priority based on German Patent Application No. 102022104049.6, filed on Feb. 21, 2022, which is hereby incorporated by reference into this application.

FIELD OF THE DISCLOSURE

The present disclosure relates to an apparatus, system and method for filling a feed mixer, with a feed intake device for picking up feed and/or feedstock from a stockpile, feed processing system for processing the feed and directing the processed feed into a container of a feed mixer.

BACKGROUND

In agriculture today, not only the cultivation of plants and their harvest is carried out with high-tech equipment, but also the provision of feed for farm animals. For this purpose, so-called feed mixers are used, which comprise a container usually open to the top, into which various components (i.e., feedstocks) of the feed are filled one after the other. Inside the container, a mixing device is arranged, usually in the form of a conical auger, which is used on the one hand for mixing and on the other hand to a certain extent also for crushing the feed. For example, reference should be made to the disclosure of German Patent Appl. No. DE 20 2016 106 837 U1. After loading and mixing and crushing the feed, the feed mixer is transported to the location or feeding place of the farm animals where the feed is unloaded. The towed or self-propelled feed mixer is loaded by a loading device, e.g., made up as a loading bucket of a front loader on a tractor or wheel loader (e.g., European Patent Appl. No. EP 2 204 088 A1) or as a silo milling machine with blower and ejection manifold (e.g., German Patent Appl. No. DE 2 225 783 A) and may be separate from the feed mixer, or be mounted to the feed mixer (e.g., European Patent Appl. EP 1 563 725 A1, European Patent Appl. EP 1 577 663 A1, WIPO WO 2005/067704 A1, German Patent Appl. No. DE 10 2010 033 888 A1).

In some examples, an automatic or semi-automatic (i.e. with instructions to an operator) loading of the feed mixer is carried out, i.e. the ingredient contents (e.g., for a given feedstock) of the feed taken from a stockpile at an associated storage point are sensed, in particular by a near-infrared (NIR) spectrometer, and depending on the ingredient content and a given recipe for the ingredients of the feed a specified quantity (mass) of the component is taken from the stockpile and filled into the feed mixer (e.g., EP 1 563 725 A1, EP 1 577 663 A1, WIPO WO 2005/067704 A1, German Patent Appl. No. DE 10 2010 033 888 A1).

The post-crushing and mixing of the feed is carried out, as already mentioned above, by the mixing device of the feed mixer, wherein a degree of mixing or crushing of the feed can be sensed and when a setpoint is reached, the mixing process can be automatically terminated (e.g., German Patent Appl. No. DE 20 2016 106 837 U1, European Patent Appl. EP 3 574 750 A1). Thus, only the crushing effect of the feed mixer is relied on in order to achieve a nutritionally meaningful comminution (but not pulverization) of the feed, while when the feed is removed from the stock, at most a certain pre-crushing takes place, especially when removing the feed from a silage stockpile with a cutting shield with tear teeth (e.g., German Patent Appl. No. DE 196 54 725 A1) or a milling device (e.g., German Patent Appl. No. DE 42 20 005 A1), but no control or dosing of the pre-crushing is possible. However, the essentially sole crushing of the feed by the feed mixer has the disadvantage that some components are crushed more than necessary, which has energetic and nutritional disadvantages, and/or other components are crushed far less than would be desirable.

BRIEF DESCRIPTION

A system for filling a feed mixer, the system comprising: a feed intake device configured to take in a feedstock from a stockpile; a feed processing system for processing the feedstock and directing the processed feedstock into a container of the feed mixer; and a controller associated with the feed processing system, the controller configured to control processing of the feedstock by the feed processing system based on a prescribed recipe.

A method for filling a feed mixer, the method comprising: intaking feedstock from a stockpile with a feed intake device; processing the feedstock with a feed processing system; controlling with a controller an amount of processing of the feedstock by the feed processing system according to a prescribed recipe; and conveying the feedstock with the feed processing system into a container of the feed mixer.

An apparatus for filling a feed mixer, the apparatus comprising: a feed intake device configured to take in a feedstock from a stockpile; a feed processing system for processing the feedstock and directing the processed feedstock into a container of the feed mixer; and a controller associated with the feed processing system, the controller configured to control processing of the feedstock by the feed processing system based on a prescribed recipe.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

The present disclosure provides an apparatus, system and corresponding method for filling a feed mixer. In one example, the system, method and apparatus may be designed as a self-propelled vehicle with or without a container for the feed or as an implement attachable to a vehicle. Specifically, the system, method and apparatus for filling a feed mixer is provided with a feed intake device for picking up feed (used interchangeably with feedstock) from a stock (used interchangeably with stockpile), feed processing system for processing the feed and directing the processed feed into a container of a feed mixer. The degree of processing of the feed processing system can be controlled according to a given recipe.

In other words, not only the amount (weight or mass) of the feed and/or its ingredients taken from a particular stockpile is electronically specified by a recipe to a controller and automatically controlled by it, but also a processing degree with which the feed taken from the stockpile is processed before being fed into the feed mixer. In this way, it is possible to define a degree of processing of the feed in the recipe, so that one is not solely dependent on the processing in the feed mixer and can adapt the processing to the respective feed stock and the associated feed. The recipe can define a working parameter of the feed processing system and/or a result to be achieved, which can be detected with a sensor arrangement and can be used by the controller to control the feed processing system. The sensor arrangement may include a camera and/or a sensor to detect the ingredients of the feed.

The feed processing system may include one or more of the following devices: pre-press rollers, a cutting device, a re-cutting device and a post-shredding device with a pair of rollers between which the feed is conveyed. The controller may be configured to reduce the conveying speed of the feed intake device just before a quantity of feed specified by the recipe has been loaded into the container to prevent the desired quantity from being exceeded. The controller may be configured to automatically control the system and the direction of the processed feed into the container of the feed mixer on the basis of the signals of a camera and/or positioning devices.

Figure 1:
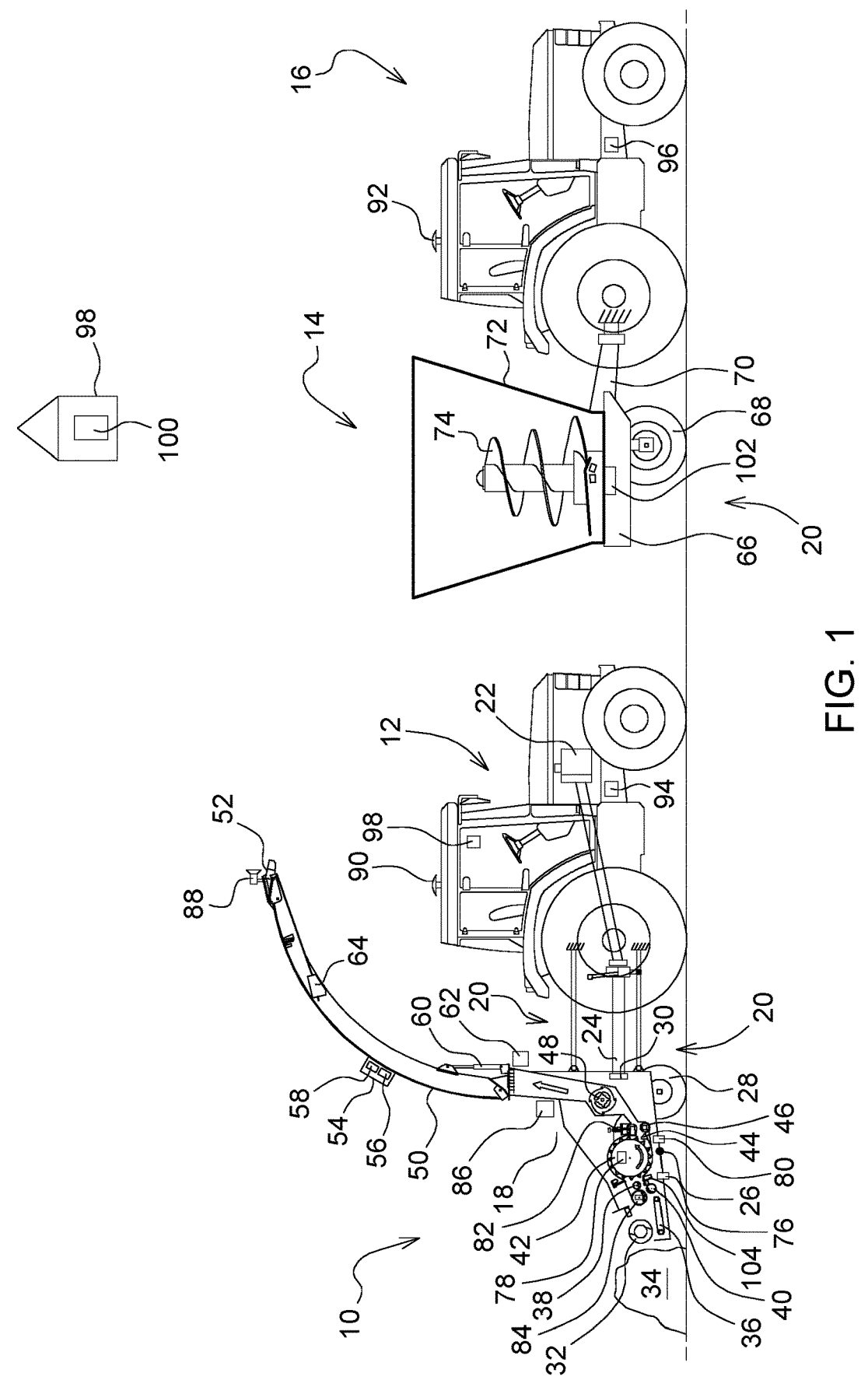
FIG. 1 is a side view of a feed mixer filling system for filling a feed mixer.

FIG. 1 shows a system, method and apparatus 10 for filling a feed mixer 14. The apparatus 10 is designed as attachment 18, which is attached to an actuator height-adjustable three-point hitch 20 of an agricultural tractor 12 and is mechanically driven by the combustion engine 22 of the agricultural tractor 12 via a drive train with a PTO 24. The apparatus 10 is attached and/or mounted in FIG. 1 to the rear three-point hitch 20; it could however alternatively be attached and/or mounted on a front three-point hitch (not shown) of the tractor 10. The feed mixer 14 is attached as a trailer to the coupling of another agricultural tractor 16.

The implement 18 comprises a supporting frame 26, which is supported on wheels 28 on the ground, which can be designed as caster steering wheels or actively (coupled with the steering of the agricultural tractor 12) steered wheels. The moving elements of the implement 18 are driven by the power take off (PTO) 24 via a gearbox 30. The mechanical drive train for the moving elements of the devices 18 could also be partially or completely replaced by an electric and/or hydraulic drive train, which also applies to the drive of the agricultural tractor 12, which could thus also be driven purely electrically, be it via a battery and/or a cable.

Implement 18 includes a feed intake device 32, which is configured to take feeds from a stockpile 34. The feed intake device 32 is designed here as an auger with teeth, with which feed can be taken from a silage container or any other stockpile 34 but could also be carried out in any other way, e.g., as a silo cutter or shovel for a portion-by-portion removal of feed from a stockpile 34. A conveyor 36, which is designed in the present case as a conveyor belt, takes over the feed received by the feed intake device 32 and transfers it to a feed conveyor with lower pre-press rollers 38 and upper pre-press rollers 40, which pre-compress it and feed it to a cutting device 42 in the form of a knife drum with knives arranged transversely to the conveying direction of the conveyed feed or placed at an angle to it, which chop it in conjunction with a shear bar 104. A re-cutting device 44 in the form of a knife comb with knives arranged longitudinally to the direction of conveying of the feed cuts the feed downstream of the knife drum 42. A post-processing device with a pair of rollers 46, between which the feed is conveyed, squeezes the feed before it is conveyed by a post-accelerator 48 into an ejection spout 50, which can be rotated by actuators 60, 62 around a horizontal and a vertical axis and at the end of which an ejection flap 52 is angle-adjustable by an actuator 64.

A sensor arrangement 54 with a camera 56 and a sensor 58, which can be an NIR sensor or Terahertz sensor or other any other sensor capable of sensing ingredients and/or constituents, to detect the ingredients of the feed is arranged on the ejection spout 50. The implement 18 resembles, apart from the feed intake device 32 and the conveyor 36, a common forage harvester, for which reference can be made, for example, to the disclosure of European Patent Appl. No. EP 1 849 348 A1. One could therefore also use a common (self-propelled or towed) forage harvester as apparatus 10.

The feed mixer wagon 14 is conventional and described, for example, in German Patent Appl. No. DE 20 2016 106 837 U1 or European Patent Appl. No. EP 3 574 750 A1. It comprises a supporting frame 66, which is supported on wheels 68 and is attached to the other agricultural tractor 18 via a drawbar 70. Attached to frame 66 is a container 72 with an open top, within which a mixing device 74 in the form of a conical auger rotating around the vertical axis is arranged, which can be driven by a mechanical drive train from the further agricultural tractor 18. In addition, the feed mixer wagon 14 includes a system for metered and/or controlled delivery of the feed. The other agricultural tractor 18 is also of conventional construction.

The implement 18 includes a series of actuators for the adjustment of working parameters. The pre-press rollers 38, 40 are driven by a variable speed drive 84 and their preload against each other can be varied by an actuator 76 (e.g., a hydraulic cylinder). The cutting device 42 is driven by a variable speed drive 78, and the penetration depth of the re-cutting device 44 into the feed strand is changeable by an actuator 80. An actuator 82 controls the distance between the rollers 46 of the post-shredding device or their contact pressure. The operating parameters of the actuators 84, 76, 78, 80 and 82 mentioned in this paragraph are controlled by a controller 86, which is also signal transmitting connected to the sensor arrangement 54.

The controller 86 also controls the actuators 60, 62, 64 based on the signals of a camera 88, in the image of which the position of the container 72 is recognized, and/or on the basis of the geographical position of the agricultural tractor 12, which is detected with a satellite signal-based positioning device 90 and wirelessly or via a bus system (e.g., according to ISO 11783) transmitted via a computer device 94 of the agricultural tractor 12 to the controller 86 and converted by the latter or the computer device 94 on the basis of a sensor-detected relative position into the position of the implement 18, as well as the geographical position of the further agricultural tractor 18, which is detected with a satellite signal-based positioning device 92 and converted by a computer device 96 of the further agricultural tractor 18, on the basis of a sensor-detected relative position into the position of the container 72, and transmitted wirelessly to the controller 86. For this purpose, reference can be made to the method for crop transfer in forage harvesters, as disclosed, for example in German Patent Appl. No. DE 10 2009 027 254 A1, wherein any filling strategy is used and a lighting device for the container 72 can be attached near the camera 88. The computer device 94 is also connected to an operator interface 98 within the operator station of tractor 12. It should be noted that at least some of the functionality of controller 86 can be outsourced to computer device 94 or to the cloud.

Figure 2:
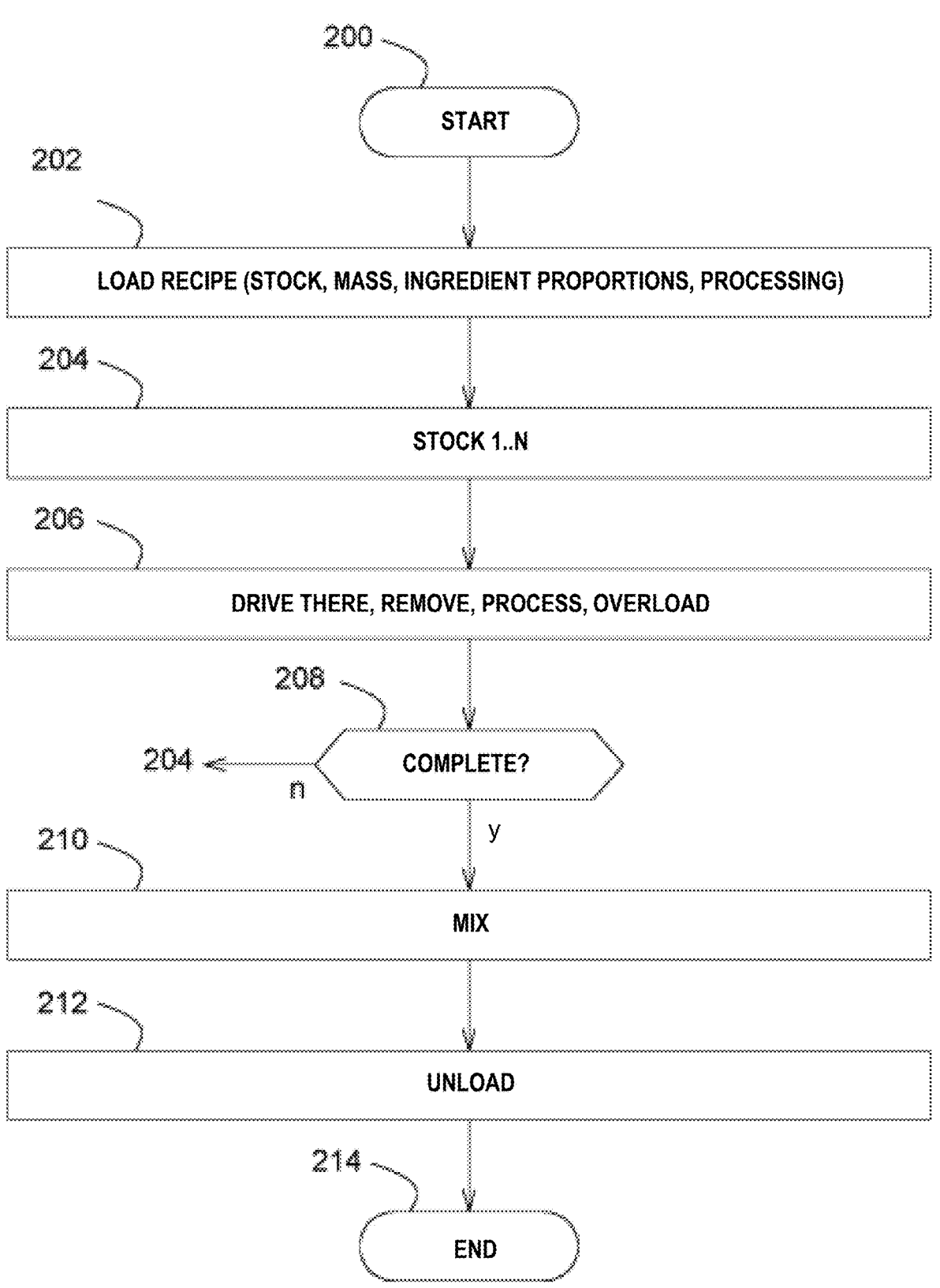
FIG. 2 is a flowchart on the operation of the system.

FIG. 2 illustrates the operation method of the apparatus according to FIG. 1. After the start in step 200, in step 202 from a server 100, which can be located at a remote place 106, e.g., in the office of the respective agricultural enterprise or (on a server 100) in the cloud, a recipe for the feed to be actually fed is downloaded, for example to the controller 86 of the implement 18 or the computer device 94 of the agricultural tractor 12 connected in a signal-transferring manner to the controller 86. The recipe can be uploaded to server 100 by a representative of the farm, or automatically based on a sensorially detected need of the livestock of the farm to be fed. On server 100 a farm manager program can be used for providing feeding optimization inputs to loading system based on AI or machine learning techniques or approaches. The recipe or parameters of feed loading can optionally be input by user through operator user interface 98 or a separate input device, like a hand-held device, like a tablet or smartphone. Examples for parameters are forage length, mass, constituents, environment impact or any other parameter required to be managed for dairy and livestock operation. Communication between server 100 and controller 86 and optionally the operator interface 98 can be performed online in any suitable manner, for example based on protocols for voice and/or data communication (like 5G, Bluetooth, WLAN, etc.). In case of limited connectivity, data can be transmitted offline, for example using portable electronic memory, like SD cards or USB sticks.

This recipe may contain a number of different stocks 34 with different components of the feed (such as silage, grain, finished feed, additives, etc.), the associated weight/mass and/or ingredient proportions and information on the processing of the feed. It may thus contain, for example, the information that the feed from a stockpile 34 with silage should contain a mass of 500 kg with a moisture content of 28%, and the silage is to be cut to a length of 10 mm. Analogous information may be included in the recipe for any number of components of the feed, which can be taken from different stocks 34. If necessary, it may also be provided that feed from certain stocks 34 is not processed or only slightly (i.e., with large cutting lengths of the cutting device 42).

In step 204, one of the stocks contained in the recipe 34 is selected, whether automatically by the controller 86 or the computer device 94 or by the operator interface 98, on which a list of stocks 34 can be displayed, from which the operator can select the next feedstock.

The operator can then (step 206) drive the agricultural tractor 12 to the respective stockpile 34 or this process is carried out automatically on the basis of known positions of the stocks and/or stockpiles. In step 206, the quantity of feed specified on the basis of the recipe is then taken from the respective stock and subjected to the processing specified in the recipe and transferred into the feed mixer 14, which was moved by an operator or an automatic control of the further agricultural tractor 18 to a place suitable for transferring. Here, the actuators 84, 76, 78, 80 and 82 are controlled by the controller 86 according to the recipe. The recipe can directly specify the working parameters of the implement 18, such as the cutting length, or a result to be achieved, which can be detected by the sensor arrangement 54. Thus, the achieved cutting length can be recorded with the camera 54 in order to be able to adjust the speed of the pre-press rollers 38, 40 and the cutting device 42 with the drives 78 and/or 84 in the sense of achieving a cutting length specified by the recipe.

Analogously, with the sensor 58 an ingredient content of the feed, e.g., protein, can be sensed and then, when a sufficient amount of feed has been transferred, the process is stopped. The transferred mass of the feed can be detected by a weight sensor 102 to detect the mass of the container 72 and passed on to the controller 86, or it is detected by the implement 18, e.g., by measuring the drive torque of a driven element, such as the post-accelerator 48 or the pre-press rollers 38, 40, or it is volumetrically detected by the camera 56. When measuring the mass of the feed by different sensors, a (less accurate) sensor can be calibrated in a known manner based on the values of another (more accurate) sensor, an averaging of the measured values can be carried out or an error message can be output in the case of grossly different values. The processing of the feed specified by the recipe is therefore carried out automatically by the controller 86, whereby the recipe can contain a sensorially detectable result of the processing, as described, or a setpoint for the operating parameters. Shortly before a quantity of feed specified by the recipe has been loaded into container 72, controller 86 can reduce the conveying speed of feed intake device 32 to prevent the desired quantity from being exceeded.

In step 208, it is queried whether all stocks 34 of the recipe have been processed. If this is not the case, step 204 is continued for the next stock and otherwise step 210 follows, in which the ingested feed quantities in the feed mixer 14 are mixed by activating the drive of the mixing device 74 (although this could also be done after each step 206 or continuously), and in step 212 the feed is presented to the animals for feeding. With step 214, the method ends. The activation durations of the drive of the mixing device 74 can be defined in the recipe, as well, and depend on the actual stockpile 34 from which the feed is taken, or they are determined, as in the state of the art, by suitable sensors.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a control unit, computer system or computing element (or portion thereof) such as, but not limited to, one or more or some combination of: a visual organizer system, a request generator, an Internet coupled computing device, a computer server, etc. In one example, the control unit, computer system and/or the computing element may manipulate and transform information and/or data represented as physical (electronic) quantities within the control unit, computer system's and/or computing element's processor(s), register(s), and/or memory(ies) into other data similarly represented as physical quantities within the control unit, computer system's and/or computing element's memory(ies), register(s) and/or other such information storage, processing, transmission, and/or display components of the computer system(s), computing element (s) and/or other electronic computing device(s). Under the direction of computer-readable instructions, the control unit, computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The invention claimed is:

1. A system for filling a feed mixer, the system comprising:

a feed intake device configured to take in a feedstock from a stockpile;

a feed processing system for processing the feedstock and directing the processed feedstock into a container of the feed mixer;

a camera configured to detect the processed feedstock; and a controller associated with the feed processing system, the controller configured to:

determine a first cutting length of the processed feedstock based on the camera; and change the processing of the feedstock from the first cutting length to a second cutting length that is specified by a recipe.

2. The system of claim 1, including a sensor arrangement associated with the feed processing system to generate one or more signals to the controller for controlling the feed processing system, the sensor arrangement including the camera.

3. The system of claim 2, wherein the sensor arrangement includes a near-infrared sensor or a terahertz sensor for detecting feedstock.

4. The system of claim 2, wherein the controller is configured to control the directing of the processed feedstock into the container of the feed mixer automatically based on one or more of the signals generated by the sensor arrangement.

5. The system of claim 1, wherein the recipe defines at least one of an ingredient information or mass associated with the feedstock.

6. The system of claim 1, wherein the controller is configured to reduce a conveying speed of the feed intake device of the feed processing system before a desired quantity of feedstock specified by the recipe is loaded into the container.

7. The system of claim 1, wherein the feed mixer is a self-propelled vehicle that includes the container for the feedstock, a self-propelled vehicle that does not include the container, or an attachment to a vehicle.

8. The system of claim 1, wherein:

the feed processing system includes pre-press rollers and a cutting device; and the controller is configured to change the processed feedstock from the first cutting length to the second cutting length by adjusting one or more speeds of the pre-press rollers and the cutting device.

9. The system of claim 1, wherein:

the feed processing system includes a pair of rollers between which the feedstock is conveyed as part of the processing; and the controller is configured to change the processed feedstock from the first cutting length to the second cutting length by adjusting a distance between the pair of rollers or a contact pressure between the rollers.

10. The system of claim 1, wherein:

the feed processing system includes a re-cutting device; and the controller is configured to change the processed feedstock from the first cutting length to the second cutting length by adjusting a penetration depth of the re-cutting device.

11. A method for filling a feed mixer, the method comprising:

intaking feedstock from a stockpile with a feed intake device;

processing the feedstock with a feed processing system;

detecting the processed feedstock with a camera;

determining, with a controller, a parameter of the processed feedstock based on the camera;

adjusting, with the controller, a distance between a pair of rollers in the feed processing system between which the feedstock is conveyed as a part of the processing the adjustment based on a recipe and the parameter; and conveying the feedstock with the feed processing system into a container of the feed mixer.

12. The method of claim 11, wherein the parameter is a first parameter, the method including controlling the feed processing system according to the recipe, the recipe having at least a second parameter relating to the feedstock or the stockpile.

13. The method of claim 12, including providing a sensor arrangement associated with the feed processing system to detect the processed feedstock and generate one or more signals to the controller for controlling the feed processing system, the sensor arrangement including the camera.

14. The method of claim 13, wherein the sensor arrangement includes a near-infrared sensor or a terahertz sensor for detecting feedstock.

15. The method of claim 13, including directing of the processed feedstock into the container of the feed mixer automatically based on one or more of the signals generated by the sensor arrangement.

16. The method of claim 12, wherein the recipe defines the second parameter of the feedstock to be taken up from the stockpile, the second parameter corresponding to at least one of an ingredient information or mass associated with the feedstock.

17. The method of claim 11, including reducing a conveying speed of the feed intake device of the feed processing system before a desired quantity of feedstock specified by the recipe is loaded into the container.

18. The method of claim 11, wherein the feed mixer is a self-propelled vehicle that includes the container for the feedstock, a self-propelled vehicle that does not include the container, or an attachment to a vehicle.

19. An apparatus for filling a feed mixer, the apparatus comprising:

a feed intake device configured to intake feedstock from a stockpile;

a feed processing system for processing the feedstock and directing the processed feedstock into a container of the feed mixer;

a camera configured to detect the processed feedstock; and a controller associated with the feed processing system, the controller configured to:

determine a parameter of the processed feedstock based on the camera; and adjust a penetration depth of a re-cutting device within the feed processing system based on a recipe and the parameter.

20. The apparatus of claim 19, including a sensor arrangement associated with the feed processing system to generate one or more signals to the controller for controlling the feed processing system, the sensor arrangement including the camera.

* * * * *